(12) United States Patent
Lee (10) Patent No.: US 7,626,666 B2
(45) Date of Patent: Dec. 1, 2009

(54) MULTI-DOMAIN VERTICAL ALIGNMENT (MVA) LIQUID CRYSTAL DISPLAY DEVICE HAVING SYMMETRICAL SECOND SLITS ON OPPOSITE EDGES OF FIRST SLITS AND ON OPPOSITE SIDES OF PROTRUSIONS

(75) Inventor: Seok-Lyul Lee, Gueishan Township, Taoyuan County (TW)

(73) Assignee: Quanta Display Inc., Tao Yuan Shien (TW)

( * ) Notice: Subject to any disclaimer, the term of this patent is extended or adjusted under 35 U.S.C. 154(b) by 660 days.

(21) Appl. No.: 11/252,797

(22) Filed: Oct. 19, 2005

(65) Prior Publication Data
US 2006/0087608 A1    Apr. 27, 2006

(30) Foreign Application Priority Data
Oct. 26, 2004    (TW) .............................. 93132411 A (51) Int. Cl.
*G02F 1/1343*    (2006.01)
(52) U.S. Cl. ................. 349/139; 349/130; 349/141; 349/143
(58) Field of Classification Search ................. 349/129, 349/141–143, 130
See application file for complete search history.

(56) References Cited

U.S. PATENT DOCUMENTS

| 7,145,619 | B2 * | 12/2006 | Sawasaki et al. | 349/129 |
| 2003/0071952 | A1 * | 4/2003 | Yoshida et al. | 349/141 |
| 2005/0030458 | A1 * | 2/2005 | Sasabayashi et al. | 349/129 |

FOREIGN PATENT DOCUMENTS

| JP | 2002107730 | 4/2002 |
| JP | 2003195327 | 7/2003 |
| JP | 2002303869 | 10/2003 |

* cited by examiner

*Primary Examiner*—John Heyman
(74) *Attorney, Agent, or Firm*—Bacon & Thomas, PLLC (57) ABSTRACT

A multi-domain vertical alignment liquid crystal display device comprises a first substrate having a plurality of protrusions and a first electrode; a second substrate having a plurality of pixel electrodes, a plurality of first slits and a plurality of second slits; and a liquid crystal layer interposed between the first substrate and the second substrate. The first electrode is disposed on the surface of the first substrate. The protrusions are disposed on part of the surface of the first electrode. The pixel electrodes are disposed on the surface of the second substrate. The first slits are disposed among the pixel electrodes without intersecting the projections of the protrusions on the second substrate. The second slits are disposed on the edge of the first slits, extending in a direction to intersect the projections of the protrusions on the second substrate.

19 Claims, 5 Drawing Sheets

MULTI-DOMAIN VERTICAL ALIGNMENT (MVA) LIQUID CRYSTAL DISPLAY DEVICE HAVING SYMMETRICAL SECOND SLITS ON OPPOSITE EDGES OF FIRST SLITS AND ON OPPOSITE SIDES OF PROTRUSIONS

BACKGROUND OF THE INVENTION

1. Field of the Invention

The present invention relates to a liquid crystal display device, and more particularly, to a multi-domain vertical alignment liquid crystal display device.

2. Description of Related Art

At present, the liquid crystal displays are all developed to have optimum size, high luminance, high contrast, wide viewing angle and high color saturation. To solve the viewing angle problem widely found in the current liquid crystal displays, a multi-domain vertical alignment (MVA) is introduced. In the MVA liquid crystal display devices, the display area is divided into multiple domains so that liquid crystals are aligned in a compensatory manner. In this connection, the phase retardation values are the same, regardless of the viewing angle. Hence, no grayscale inversion phenomenon is generated. Also, the contrast is increased, and the response time is shortened.

Figure 1A:
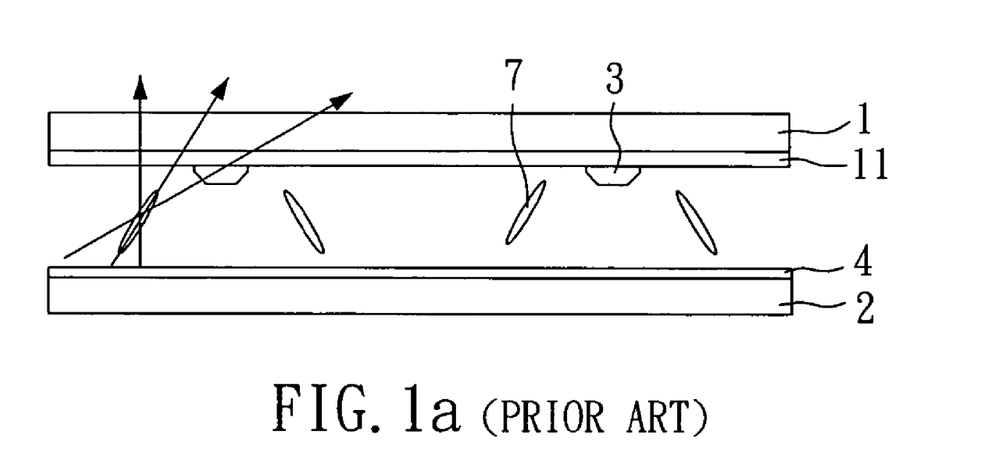
FIG. 1(a) is a cross-sectional view of a conventional multi-domain vertical alignment liquid crystal display device.
Figure 1B:
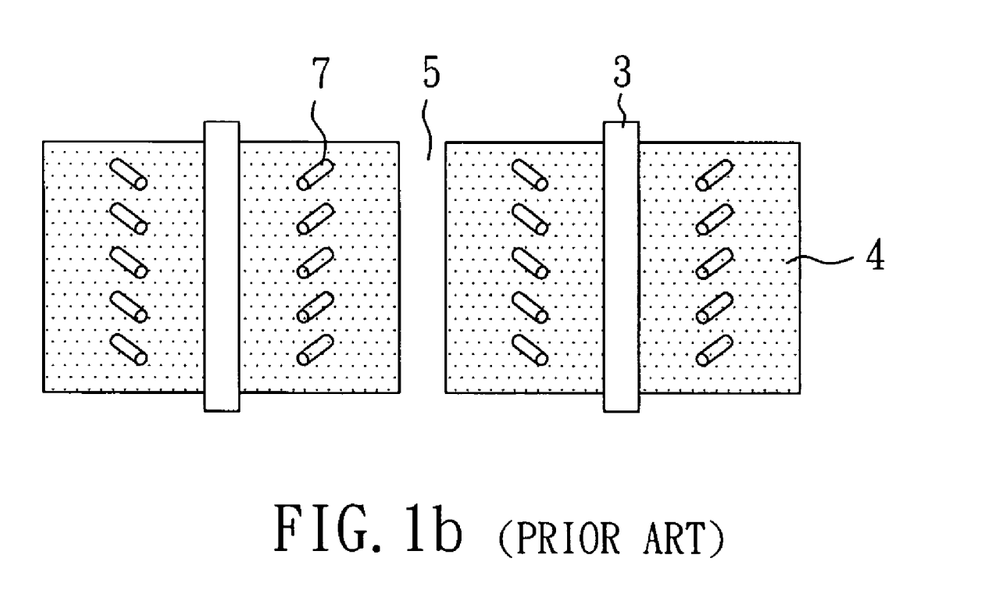
FIG. 1(b) is a top view of a conventional multi-domain vertical alignment liquid crystal display device.

FIG. 1(a) and FIG. 1(b) show a cross-sectional view and a top view of a conventional MVA liquid crystal display device, respectively. As shown, a first electrode 11 having a plurality of protrusions 3 disposed on the surface thereof is disposed on the surface of a first substrate 1. Pixel electrodes 4 are disposed on the surface of a second substrate 2, a plurality of first slits 5 being interposed between the pixel electrodes 4 for spacing the pixel electrodes 4 apart. Thus, liquid crystal molecules 7 in the same domain are tilted in an identical direction. In other words, the conventional MVA liquid crystal display devices have the same tilted angle in one grayscale. Even so, the liquid crystal shows display images in different grayscales by the refractive characteristic of the liquid crystals. When the angle between a sight line and the liquid crystals is changed, the light intensity sensed by the eye will be inconsistent. Therefore, when the conventional MVA liquid crystal display device is viewed (as shown in FIG. 1(a)) from different angles, the sight line and the longitudinal axis of the liquid crystals form various angles which results in a non-uniform brightness, especially at any of two adjacent display domains in the vicinity of the protrusions of the pixel electrodes of the multi-domain vertical alignment liquid crystal display device as viewed in a microcosmic state. This is because the liquid crystal molecules within these two adjacent domains tilt at different angles when a voltage is applied. When viewed, the sight line forms various angles with respect to the longitudinal axis of the liquid crystals, and thus, the two adjacent domains have non-uniform brightness. The person will therefore see the non-uniform brightness at the two adjacent domains in the vicinity of the protrusions. When such an effect expands to the whole panel display area, the panel will have non-uniform brightness and impaired display quality. Therefore a dire need exists to improve the conventional MVA liquid crystal display devices.

SUMMARY OF THE INVENTION

The present invention provides a multi-domain vertical alignment liquid crystal display device. The multi-domain vertical alignment liquid crystal display device comprises a first substrate having a plurality of protrusions and a first electrode; a second substrate having a plurality of pixel electrodes, a plurality of first slits and a plurality of second slits; and a liquid crystal layer interposed between the first substrate and the second substrate. The first electrode is disposed on the surface of the first substrate. The protrusions are disposed on part of the surface of the first electrode. The pixel electrodes are disposed on the surface of the second substrate. The first slits are disposed among the pixel electrodes without intersecting the projections of the protrusions on the second substrate. The second slits are disposed on the edge of the first slits, extending in a direction to intersect the projections of the protrusions on the second substrate.

The substrate used for the multi-domain vertical alignment liquid crystal display device of the present invention can be a transparent substrate, preferably a glass substrate. The pixel electrode of the multi-domain vertical alignment liquid crystal display device of the present invention can be made from a material for transparent electrodes, preferably indium tin oxide (ITO) or indium zinc oxide (IZO). Preferably, the multi-domain vertical alignment liquid crystal display device of the present invention further comprises a color filter over the first substrate surface. The multi-domain vertical alignment liquid crystal display device of the present invention can selectively further comprise functional elements to expand or improve the function thereof. Preferably, scanning lines, data lines and switching elements are included on the second substrate. The aforesaid switching element of the multi-domain vertical alignment liquid crystal display device of the present invention preferably is a thin-film transistor. The multi-domain vertical alignment liquid crystal display device of the present invention can selectively further comprise a vertical alignment layer over the pixel electrode surface. The multi-domain vertical alignment liquid crystal display device of the present invention can selectively further comprise a gate isolation layer or a passivation layer, preferably disposed over the second substrate surface, to improve the isolation between the lines.

In addition, the intersection angle formed by an extension direction of the second slits and the projections of the protrusions is not specifically defined, preferably in the range of 80 degrees and 110 degrees; more preferably, 90 degrees. The first slits and the projections of the protrusions on the second substrate of the present invention do not intersect. Preferably, they are parallel with each other. The length distribution of the second slits of the present invention is not specifically defined. Preferably, at least two of the second slits are different in length. More preferably, the length of the second slits is arranged to gradually decrease or increase from both ends of the same edge of the pixel electrodes to the middle of the pixel electrodes. The space width distribution of the second slits therebetween of the present invention is not specifically defined. Preferably, at least two space widths for three of the second slits are different. More preferably, the space width of the second slits is arranged to decrease or increase gradually from both ends of the same edge of the pixel electrodes to the middle of the pixel electrodes. Due to a change of the length or the density of the arrayed pixel electrodes, different electric fields are generated when a voltage is applied so that the liquid crystal molecules generate different rotation angles. Thus, in the liquid crystal display device of the present invention, the liquid crystal molecules in the vicinity of different second slits bring about different tilted angles in one grayscale. As a result, the tilted angles of the domains in the vicinity of one of the protrusions are different. Even so, the tilted angles of the liquid crystal molecules are distributed in a regular manner because the second slits are distributed in a regular manner. It has been known that the transmissivity of the liquid crystal display relates to the total average refractive index caused by the tilted angles of the liquid crystal molecules. With the arrangement of the second slits as disclosed in the present invention, the total average tilted angle of the liquid crystal molecules in the vicinity of the protrusions is about the same. Thus, the total average refractive index caused by the tilted angles of the liquid crystal molecules appears appropriately the same, and also, the transmissivity of the domains in the vicinity of the protrusions appears appropriately the same. The liquid crystal display device of the present invention is capable of achieving not only a wide viewing angle but also a uniform brightness viewed at various viewing angles in one grayscale.

Other objects, advantages, and novel features of the invention will become more apparent from the following detailed description when taken in conjunction with the accompanying drawings.

DETAILED DESCRIPTION OF THE PREFERRED EMBODIMENT

Figure 2A:
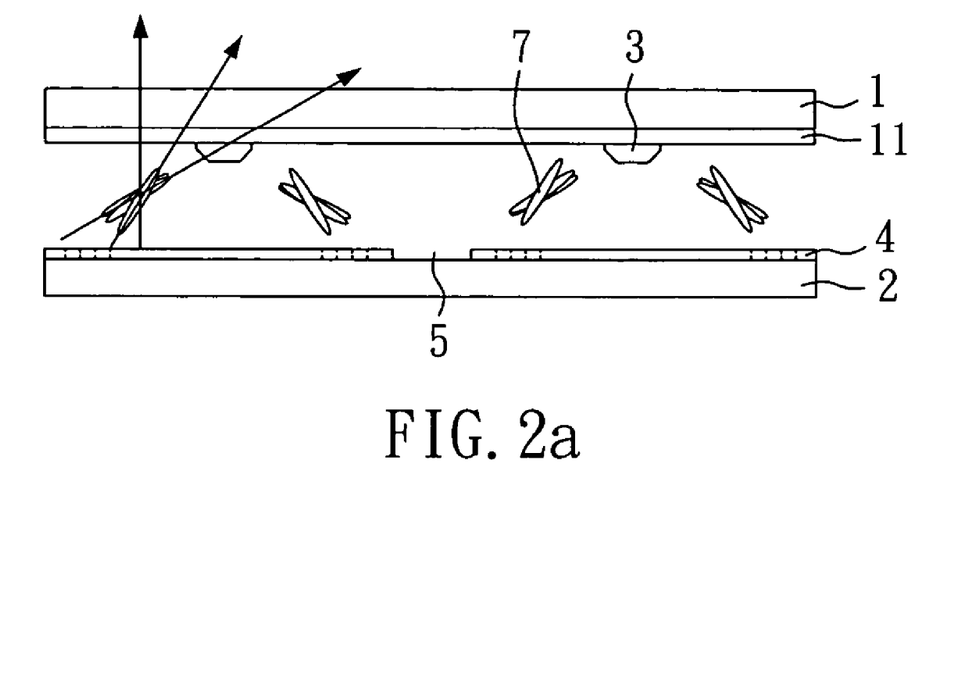
FIG. 2(a) is a cross-sectional view of a liquid crystal display device according to a first preferred embodiment of the present invention.
Figure 2B:
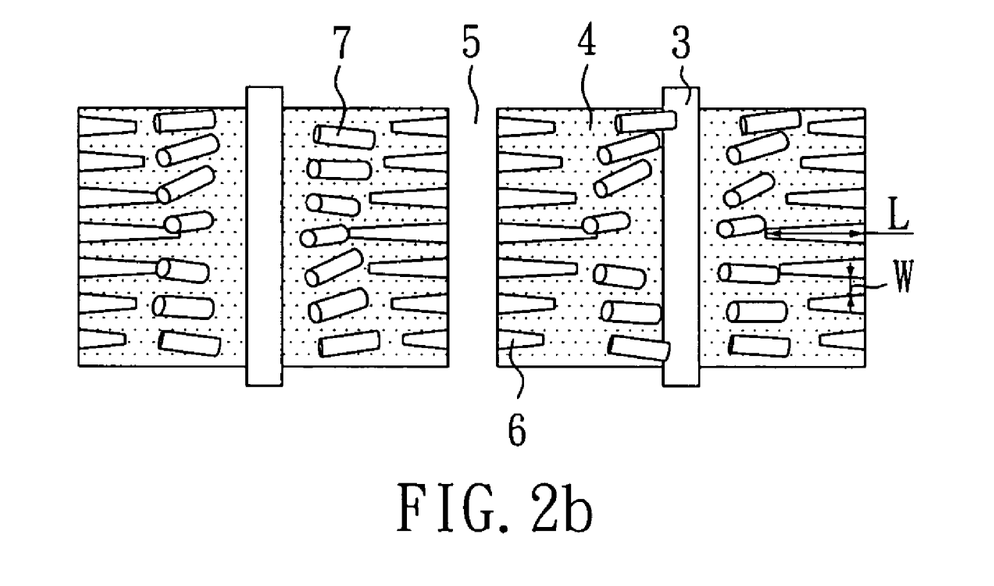
FIG. 2(b) is a top view of a liquid crystal display device according to a first preferred embodiment of the present invention.
Figure 2C:
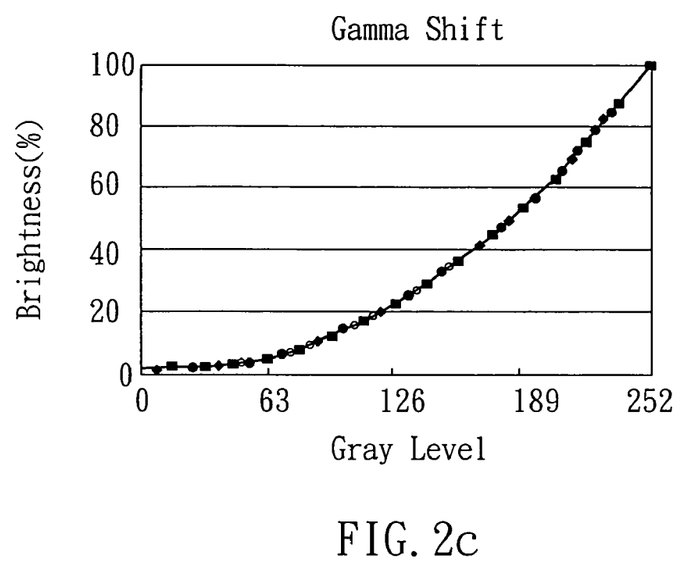
FIG. 2(c) is a diagram illustrating the relationship between brightness and grayscale of a liquid crystal display device of the present invention, observed from various viewing angles.

At first, reference is made to FIG. 2(a) and FIG. 2(b) which are a cross-sectional view and a top view of a multi-domain vertical alignment liquid crystal display device of the present invention, respectively. As illustrated, this multi-domain vertical alignment liquid crystal display device comprises a first substrate 1, a second substrate 2, and a negative liquid crystal layer 7. As shown in FIGS. 2(a) and 2(b), a first electrode 11, a plurality of protrusions 3, pixel electrodes 4, first slits 5 and second slits 6 are disposed. The first electrode 11 is disposed over the surface of the first substrate 1. The plurality of protrusions 3 is disposed on the surface of the first substrate 1. The pixel electrodes 4 having the plurality of first slits 5 in parallel with the protrusions 3 are disposed over the surface of the second substrate 2, the first slits 5 being used for spacing the pixel electrodes 4 apart. The second slits 6 are disposed on the edge of the first slits 5, extending in a direction perpendicular to the projections of the protrusions 3 on the second substrate 2. The length (L) of the second slits 6 is arranged to gradually increase from both ends of the same edge of the pixel electrodes 4 to the middle of the pixel electrodes 4. In this preferred embodiment, the negative liquid crystal layer is interposed between the first substrate 1 and the second substrate 2. When a voltage is applied to this liquid crystal display device, the electric field of the liquid crystal display device is affected by the length of the second slits 6 so that the negative liquid crystal molecules 7 in one grayscale generate different tilted angles. In other words, the liquid crystal molecules have different tilted angles in the vicinity of the same protrusion of one of the pixel electrodes. Even so, the tilted angles of the liquid crystal molecules 7 are distributed in a regular manner because the second slits 6 are distributed in a regular manner. It has been known that the transmissivity of the liquid crystal display relates to the total average refractive index caused by the tilted angles of the liquid crystal molecules. With the arrangement of the second slits as disclosed in the present invention, the total average tilted angle of the liquid crystal molecules in the vicinity of the protrusions is about the same. Thus, the total average refractive index caused by the tilted angles of the liquid crystal molecules appears appropriately the same, and also, the transmissivity of the domains in the vicinity of the protrusions appears appropriately the same. In this connection, the brightness distribution of the liquid crystal display device is improved, resulting in a uniform brightness of the liquid crystal display device. Hence, there is a uniform brightness (as shown in FIG. 2(c)), regardless of the viewing angle with respect to the liquid crystal display device.

Figure 3A:
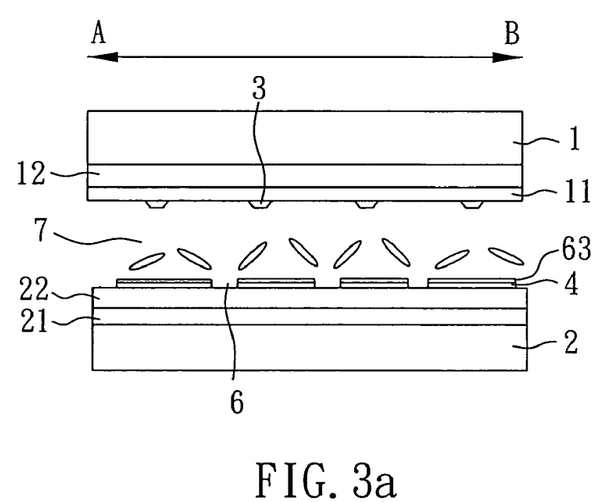
FIG. 3(a) is a cross-sectional view of a liquid crystal display device according to a second preferred embodiment of the present invention.
Figure 3B:
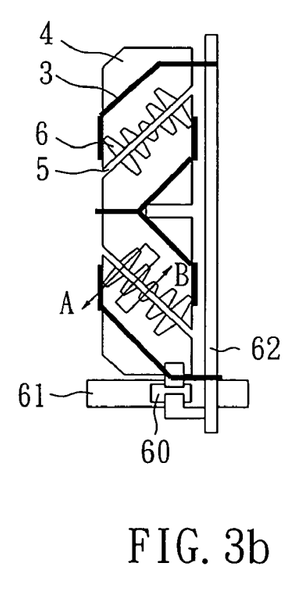
FIG. 3(b) is a top view of a liquid crystal display device according to a second preferred embodiment of the present invention.

FIGS. 3(a) and 3(b) provides another aspect (embodiment) of a multi-domain vertical alignment liquid crystal display device of the present invention. Referring to FIG. 3(a), in which a cross-sectional structure taken along line A-B in FIG. 3(a) is shown in FIG. 3(b), a color filter 12 is interposed between a first substrate 1 and a first electrode 11. A plurality of protrusions 3 is disposed over the surface of the first electrode 11. Above the second substrate, a gate isolation layer 21 and a passivation layer 22 are disposed between a second substrate 2 and pixel electrodes 4. The pixel electrodes 4 have a vertical alignment layer 63 over the surface thereof and a plurality of first slits 5 for spacing apart the pixel electrodes, the first slits 5 being parallel with the protrusions 3. Second slits 6 are disposed on the edge of the first slits 5, extending in a direction perpendicular to the projections of the protrusions 3 on the second substrate 2. The length (L) of the second slits 6 is arranged to gradually decrease from both ends of the same edge of the pixel electrodes 4 to the middle of the pixel electrodes 4. A negative liquid crystal layer 7 is interposed between the first substrate 1 and the second substrate 2. In addition, a thin-film transistor (TFT) 60 is connected to the pixel electrodes 4 to serve as a switching element of the liquid crystal display device. The TFT 60 is further connected to a scanning line 61 and a data line 62. As such, when the TFT 60 supplies a voltage to the liquid crystal display device, the length of the second slits 6 affects the electric field of the liquid crystal display device. Basically, the shorter the length of the second slits 6 is, the smaller the tilted angle of the liquid crystal molecules will be. In other words, the tilted angle of the liquid crystal molecules is arranged to gradually decrease from both ends of the same edge of the pixel electrodes to the middle of the pixel electrodes (FIG. 3 (b)) so as to obtain a uniform average value of the tilted angles of the liquid crystals. The tilted angles of the liquid crystal molecules are distributed in a regular manner because the second slits 6 are distributed in a regular manner. It has been known that the transmissivity of the liquid crystal display relates to the total average refractive index caused by the tilted angles of the liquid crystal molecules. With the arrangement of the second slits 6 as disclosed in the present invention, the total average tilted angle of the liquid crystal molecules in the vicinity of the protrusions 3 is about the same. Thus, the total average refractive index caused by the tilted angles of the liquid crystal molecules appears appropriately the same, and also, the transmissivity of the domains in the vicinity of the protrusions 3 appears appropriately the same. In this connection, the brightness distribution of the liquid crystal display device is improved, resulting in a uniform brightness of the liquid crystal display device.

Figure 4A:
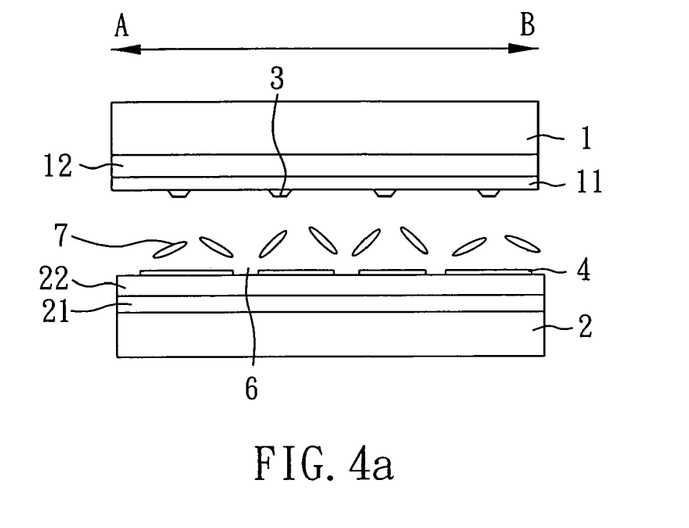
FIG. 4(a) is a cross-sectional view of a liquid crystal display device according to a third preferred embodiment of the present invention.
Figure 4B:
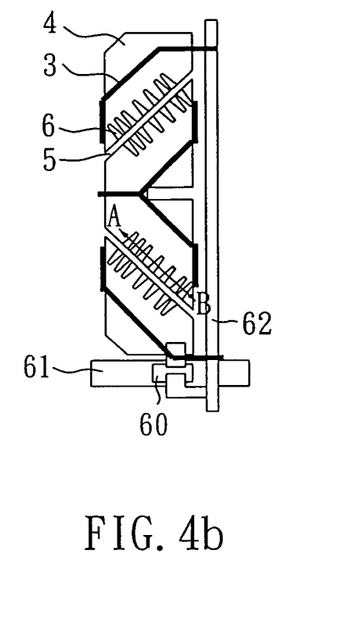
FIG. 4(b) is a top view of a liquid crystal display device according to a third preferred embodiment of the present invention.

FIGS. 4(a) and 4(b) provides a further aspect (embodiment) of a multi-domain vertical alignment liquid crystal display device of the present invention. Referring to FIG. 4(a), in which a cross-sectional structure taken along line A-B in FIG. 4(a) is shown in FIG. 4(b), second slits 6 are spaced apart in different space widths. The width (W) is arranged to increase gradually from both ends of the same edge of the pixel electrodes 4 to the middle of the pixel electrodes 4, though the other components are constructed identical to those disclosed in FIG. 3(a). When a TFT 60 supplies a voltage to the liquid crystal display device, the wider the space (W) of the second slits 6 is, the smaller the tilted angle of the liquid crystal molecules will be. Such a design achieves effects similar to those of the aforesaid embodiment. The tilted angles of the liquid crystal molecules 7 are distributed in a regular manner because the second slits 6 are distributed in a regular manner. It has been known that the transmissivity of the liquid crystal display relates to the total average refractive index caused by the tilted angles of the liquid crystal molecules. With the arrangement of the second slits 6 as disclosed in the present invention, the total average tilted angle of the liquid crystal molecules in the vicinity of the protrusions 3 is about the same. Thus, the total average refractive index caused by the tilted angles of the liquid crystal molecules appears appropriately the same, and also, the transmissivity of the domains in the vicinity of the protrusions 3 appears appropriately the same. In this connection, the brightness distribution of the liquid crystal display device is improved, resulting in a uniform brightness of the liquid crystal display device. In other words, the tilted angle of the liquid crystal molecules is arranged to gradually decrease from both ends of the same edge of the pixel electrodes to the middle of the pixel electrodes (FIG. 4 (b)) so as to obtain a uniform average value of the tilted angles of the liquid crystal molecules and a uniform brightness of the liquid crystal display device.

Figure 5A:
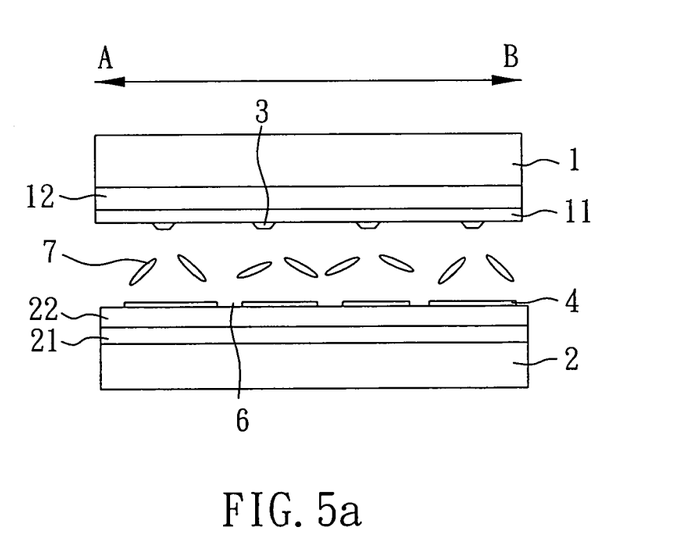
FIG. 5(a) is a cross-sectional view of a liquid crystal display device according to a fourth preferred embodiment of the present invention.
Figure 5B:
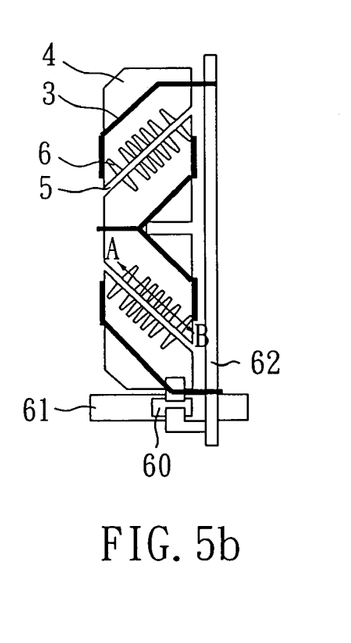
FIG. 5(b) is a top view of a liquid crystal display device according to a fourth preferred embodiment of the present invention.

FIGS. 5(a) and 5(b) provide a further aspect (embodiment) of a multi-domain vertical alignment liquid crystal display device of the present invention. Referring to FIG. 5(a), in which a cross-sectional structure taken along line A-B in FIG. 5(a) is shown in FIG. 5(b), second slits 6 are spaced apart in different space widths. The width (W) is arranged to gradually decrease from both ends of the same edge of the pixel electrodes to the middle of the pixel electrodes, though the other components are constructed identical to those disclosed in FIG. 3(a). When a TFT 60 supplies a voltage to the liquid crystal display device, the wider the space (W) of the second slits 6 is, the smaller the tilted angle of the liquid crystal molecules will be. Such a design achieves effects similar to those of the aforesaid embodiment. The tilted angles of the liquid crystal molecules 7 are distributed in a regular manner because the second slits 6 are distributed in a regular manner. It has been known that the transmissivity of the liquid crystal display relates to the total average refractive index caused by the tilted angles of the liquid crystal molecules. With the arrangement of the second slits 6 as disclosed in the present invention, the total average tilted angle of the liquid crystal molecules in the vicinity of the protrusions 3 is about the same. Thus, the total average refractive index caused by the tilted angles of the liquid crystal molecules appears appropriately the same, and also, the transmissivity of the domains in the vicinity of the protrusions 3 appears appropriately the same. In this connection, the brightness distribution of the liquid crystal display device is improved, resulting in a uniform brightness of the liquid crystal display device. In other words, the tilted angle of the liquid crystal molecules is arranged to gradually increase from both ends of the same edge of the pixel electrodes to the middle of the pixel electrodes (FIG. 5 (b)) so as to obtain a uniform average value of the tilted angles of the liquid crystal molecules.

Figure 6:
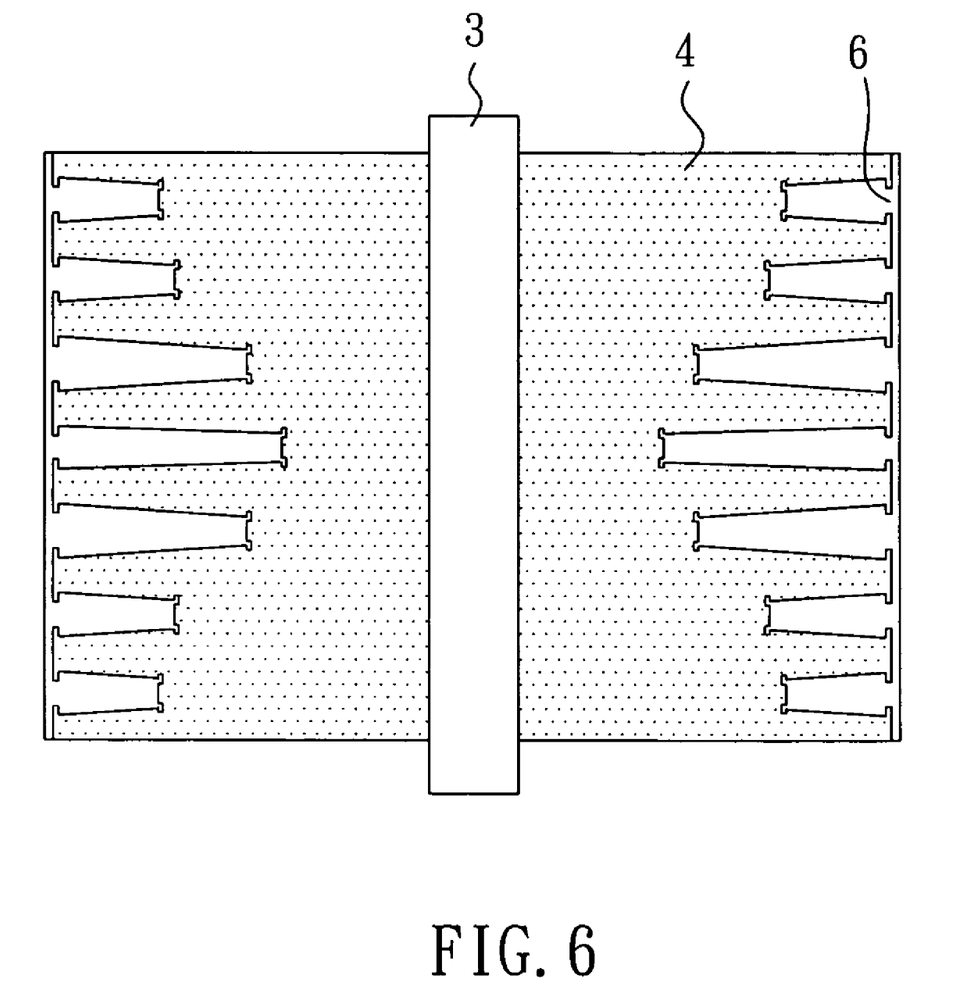
FIG. 6 is a schematic view of a compensation structure of a pattern for forming slits according to the present invention.

In addition, to obtain a smooth corner for the second slits 6 of the present invention, it is usually to provide a compensation structure with a mask pattern for forming the slits by photolithography. A preferred pattern is a rectangular compensation structure projecting from the corners of the slits as shown in FIG. 6.

Although the present invention has been explained in relation to its preferred embodiments, it is to be understood that many other possible modifications and variations can be made without departing from the spirit and scope of the invention as hereinafter claimed.

What is claimed is:

1. A multi-domain vertical alignment liquid crystal display device, comprising:
   a first substrate having a plurality of protrusions and a first electrode, wherein said first electrode is disposed on a surface of said first substrate while said protrusions are disposed on a part of the surface of said first electrode;
   a second substrate having a plurality of pixel electrodes disposed on a surface of said second substrate, a plurality of first slits disposed among said pixel electrodes without intersecting the projections of said protrusions on said second substrate, and a plurality of second slits disposed on the two opposite edges of said first slits, wherein said second slits extend in a direction to intersect said projections of said protrusions on said second substrate and said second slits at said opposite edges of said first slits are symmetric to each other and said second slits at opposite sides of said protrusions are symmetric to each other; and
   a liquid crystal layer interposed between said first substrate and said second substrate.

2. The device of claim 1, wherein an intersection angle between said second slits and said projections of said protrusions is in the range of 80 degrees and 110 degrees.

3. The device of claim 1, wherein said first slits are parallel with said projections of said protrusions on said second substrate.

4. The device of claim 1, wherein at least two of said second slits in one of said pixel electrodes are different in length.

5. The device of claim 1, wherein at least two of spaces between said second slits in one of said pixel electrodes are different in width.

6. The device of claim 1, wherein the length (L) of said second slits is arranged to gradually decrease from both ends of the same edge of said pixel electrodes to the middle of said pixel electrodes.

7. The device of claim 1, wherein the length (L) of said second slits is arranged to gradually increase from both ends of the same edge of said pixel electrodes to the middle of said pixel electrodes.

8. The device of claim 1, wherein the width (W) between said second slits is arranged to gradually decrease from both ends of the same edge of said pixel electrodes to the middle of said pixel electrodes.

9. The device of claim 1, wherein the width (W) between said second slits is arranged to gradually increase from both ends of the same edge of said pixel electrodes to the middle of said pixel electrodes.

10. The device of claim 1, wherein said first substrate further comprises a color filter disposed on the surface of said first substrate.

11. The device of claim 1, wherein said second substrate further comprises a plurality of scanning lines, a plurality of data lines and a plurality of switching elements.

12. The device of claim 1, wherein said second substrate further comprises a vertical alignment layer disposed on the surface of said pixel electrodes.

13. The device of claim 1, wherein said second substrate further comprises a gate isolation layer and a passivation layer disposed over the surface of said second substrate.

14. The device of claim 1, wherein said first substrate and said second substrate are glass substrates.

15. The device of claim 1, wherein said pixel electrodes are made of indium tin oxide (ITO) or indium zinc oxide (IZO).

16. The device of claim 11, wherein said switching elements are thin-film transistors.

17. A multi-domain vertical alignment liquid crystal display device, comprising:

a first substrate having a plurality of protrusions and a first electrode, wherein said first electrode is disposed on a surface of said first substrate while said protrusions are disposed on a part of the surface of said first electrode;

a second substrate having a plurality of pixel electrodes disposed on a surface of said second substrate, a plurality of first slits disposed among said pixel electrodes without intersecting the projections of said protrusions on said second substrate, and a plurality of second slits disposed on the edge of said first slits, wherein said second slits extend in a direction to intersect said projections of said protrusions on said second substrate wherein two second slits at two sides of a protrusion have the same pattern, length and distance to the protrusion; and a liquid crystal layer interposed between said first substrate and said second substrate.

18. The device of claim 1, wherein the liquid crystal is a negative liquid crystal and the total average tilted angle of the liquid crystal molecules in the vicinity of the protrusions is about the same.

19. The device of claim 17, wherein the liquid crystal is a negative liquid crystal the total average tilted angle of the liquid crystal molecules in the vicinity of the protrusions is about the same.

* * * * *

UNITED STATES PATENT AND TRADEMARK OFFICE
CERTIFICATE OF CORRECTION

PATENT NO. : 7,626,666 B2
APPLICATION NO. : 11/252797
DATED : December 1, 2009
INVENTOR(S) : Seok-Lyul Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 996 days.

Signed and Sealed this

Twenty-first Day of December, 2010

David J. Kappos
*Director of the United States Patent and Trademark Office*